(12) United States Patent
Gerrits et al.

(10) Patent No.: US 10,144,788 B2
(45) Date of Patent: Dec. 4, 2018

(54) POLYETHYLENE HOMO- OR COPOLYMER HAVING IMPROVED WEAR PROPERTIES

(71) Applicant: SABIC GLOBAL TECHNOLOGIES B.V., Bergen op Zoom (NL)

(72) Inventors: Niclasina Siberta Johanna Alberdina Gerrits, Sittard (NL); Nicolaas Hendrika Friederichs, Brunssum (NL); Matthijs van Kessel, Oirsbeek (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/526,783

(22) PCT Filed: Oct. 27, 2015

(86) PCT No.: PCT/EP2015/074860
§ 371 (c)(1),
(2) Date: May 15, 2017

(87) PCT Pub. No.: WO2016/078878
PCT Pub. Date: May 26, 2016

(65) Prior Publication Data
US 2017/0313794 A1    Nov. 2, 2017

(30) Foreign Application Priority Data
Nov. 18, 2014  (EP) .................................. 14193669

(51) Int. Cl.
C08F 10/02 (2006.01)
C08F 110/02 (2006.01)

(52) U.S. Cl.
CPC ............ C08F 10/02 (2013.01); C08F 110/02 (2013.01)

(58) Field of Classification Search
None
See application file for complete search history.

(56) References Cited

FOREIGN PATENT DOCUMENTS

WO    2011089017 A1    7/2011
WO    2013087185 A2    6/2013

OTHER PUBLICATIONS

"Stamylan UH—Touching Perfection at Every Turn"; Nov. 12, 2008, pp. 1-4, Retrieved from the Internet: URL: http://www.dsm.com/en_US/downloads/stamylan/DSM1038-Broch_Stamylanv8.pdf.
Berzen et al., "Ultrahigh Molecular Weight Polyethylene (UHMW-PE): Application in Artificial Joints," The British Polymer Journal, vol. 10, Dec. 1978, pp. 281-287.
Hohn at al; Verschleissverhalten von ultrahochmolekularem Polyethylene bei Gleitbeanspruchung; Kunststoffe 82(5), p. 391-394, 1992, Carl Hansel Verlag with English Abstract.
International Search Report for International Application No. PCT/EP2015/074860; International Filing Date: Oct. 27, 2015; dated Feb. 11, 2016; 6 Pages.
Kelly, "Ultra-High Molecular Weight Polyethylene," Journal of Macromolecular Science, Part C—Polymer Reviews (2002); vol. C42, No. 3, pp. 355-371.
Peacock "Handbook of Polyethylene: Structures, Properties, and Applications" Marcel Dekker, Inc. New York, 2000, pp. 1-66.
Stein, "Ultra High Molecular Weight Polyethylene (UHMWPE)," Engineered Materials Handbook, vol. 2: Engineering Plastics, ASM International 1999 p. 167-171.
Ticona Gmbh et al. "GUR"; Mar. 31, 2011, pp. 1-35, Retrieved from the Internet: URL: http://www.hipolymers.com.ar/pdfs/gur/diseno/GUR (PE-UHMW).pdf.
Written Opinion of the International Searching Authority for International Application No. PCT/EP2015/074860; International Filing Date: Oct. 27, 2015; dated Feb. 11, 2016; 7 Pages.

*Primary Examiner* — Catherine S Branch
(74) *Attorney, Agent, or Firm* — Cantor Colburn LLP

(57) ABSTRACT

The present invention relates to a polyethylene homo- or copolymer having improved wear properties. In particular, the invention relates to an ultra-high molecular weight polyethylene having improved wear properties prepared using a heterogeneous Ziegler catalyst system. Said polyethylene homo- or copolymer is characterized in that the abrasion index of said polyethylene is related to the elongational stress according to the formula (I): in which ES=elongational stress as measured according to ISO 11542-2:1998 AI=abrasion index, as measured according to ISO 15527:2010 where the reference material according to ISO 15527:2010 is set to 100; $\beta<1.8$; and $-0.015<a<-0.017$.

$$AI < \frac{ES - \beta}{\alpha} \quad \text{(I)}$$

16 Claims, No Drawings

POLYETHYLENE HOMO- OR COPOLYMER HAVING IMPROVED WEAR PROPERTIES

CROSS REFERENCE TO RELATED APPLICATIONS

This application is a 371 of International Application No. PCT/EP2015/074860, filed Oct. 27, 2015, which claims priority to European Application No. 14193669.0, filed Nov. 18, 2014 which are incorporated herein by reference in their entirety.

The present invention relates to a polyethylene homo- or copolymer having improved wear properties. In particular, the invention relates to an ultra-high molecular weight polyethylene having improved wear properties prepared using a heterogeneous Ziegler catalyst system.

In applications where polymer parts are subject to friction, it is essential that said polymer part is sufficiently resistant to wear in order to ensure its quality for the designed use and the designed lifespan. In certain applications, said polymer parts are manufactured from polyethylene. In such case, said polyethylene is required to have sufficient wear resistance to allow it to withstand said friction adequately.

One particular type of polyethylene that may be used for such applications is ultra-high molecular weight polyethylene. Ultra high molecular weight polyethylenes (UHMWPE) form a class of materials that have a unique set of material properties. UHMWPE is defined as polyethylene having a molecular weight of more than about 500,000 g/mol, preferably more than about 1,000,000 g/mol. Commonly, the molecular weight is more than 3,000,000 g/mol, preferably more than 5,000,000 g/mol, and even may range above 10,000,000 g/mol. The polymer synthesis to obtain UHMWPE is disclosed in J. Macromolecular Science C: Polymer Reviews, vol. C42, 3, p. 355-371, 2002.

As a result of the high molecular weight, the UHMWPE materials have a very high melt viscosity. Because of this high melt viscosity, UHMWPE materials can not be processed using conventional moulding methods for thermoplastics. Therefore, specialized processing methods like compression moulding and ram extrusion are applied. The shaping process that takes place in both these moulding methods is described in e.g. H. L. Stein, Engineered Materials Handbook, Vol 2: Engineering Plastics, ASM International, 1999, p. 167-171. For typical processing procedures such as ram extrusion and compression moulding, which both involve sintering of the powder particles, a specific particle size and distribution are required. This sintering is preferably carried out using a dense polymer powder packing in the mould. For this, a high powder bulk density is required. The bulk density of UHMWPE as measured according to ISO 60:1977 should preferably be above 0.3 g/cm$^3$, more preferably above 0.35 g/cm$^3$, even more preferably above 0.4 g/cm$^3$. The average particle size D$_{50}$ as measured according to ISO-13320:2009 is preferably lower than 250 μm, more preferably lower than 200 μm, even more preferably lower than 175 μm.

A very important property is the wear resistance. Many of the target applications of UHMWPE particularly require a very high wear resistance. In general, a higher molecular weight results in a higher wear resistance. However, this leads to a drawback in that higher molecular weight material results in reduced processing properties of the material. For that reason, conventional UHMWPE materials either have a high wear resistance, or good processing properties. Such materials are for example disclosed in 'Verschleissverhalten von ultrahochmolekularem Polyethylene bei Gleitbeanspruchung', Hohn at al, Kunststoffe 82(5), p. 391-394, 1992, Carl Hanser Verlag. There are however certain applications that require both high wear resistance as well as good processing properties. It is clear that there is a need to develop ultra-high molecular weight materials that incorporate both.

In the context of the present invention, wear is defined as the loss of material due to hard particles or hard protuberances that are forced against and move along a solid substrate surface. Wear resistance is therefor the ability to withstand the forcing of and moving of hard particles or hard protuberances along a solid substrate surface.

Friction in the context of the current invention is defined as the force resisting the relative motion of solid surfaces when contacting each other.

The melt viscosity of ultra-high molecular weight polyethylene is indicative for its processing properties. Melt viscosity is related to the elongational stress. The elongational stress is the tensile stress required to increase the measured length of a test specimen by 600% at 150° C. over a 10 minute period. Higher elongational stress indicates a higher molecular weight. The elongational stress is measured according to ISO 11542:1998. In order to fulfill the processing requirements, elongational stress is preferably below 0.5 MPa, more preferably below 0.4 MPa, more preferably below 0.3 MPa, even more preferably below 0.2 MPa.

UHMWPE materials having good processability are known. For example, in WO2011089017, UHMWPE materials are described which are produced using a catalyst system comprising both hafnium and chromium, and which are melt processable. Although providing good processability characteristics, these materials suffer from the drawback that the wear resistance is not adequate, as evidenced by the abrasion index as measured according to ISO 15527:2010 of higher than 1.

It is an object of the present invention to provide a polyethylene that provides high wear resistance properties whilst also having good processing properties.

This is achieved by a polyethylene homo- or copolymer in which the abrasion index of said polyethylene is related to the elongational stress according to the formula:

$$AI < \frac{ES - \beta}{\alpha}$$

in which
 ES=elongational stress as measured according to ISO 11542-2:1998
 AI=abrasion index, as measured according to ISO 15527:2010 where the reference material according to ISO 15527:2010 is set to 100;
 β<1.8; and
 −0.015>α>−0.017.

Preferably, β<1.7, more preferably β<1.6, even more preferably β<1.5, even more preferably β<1.4, even more preferably β<1.3, even more preferably β<1.2.

Preferably, −0.016>α>−0.017, more preferably −0.0165>α>−0.017. For example, α=−0.0165.

Polyethylenes complying with this relation between elongational stress and abrasion have an improved balance of processability, such as mouldability, and wear resistance.

In a preferred embodiment, said polyethylene is produced by reacting ethylene with optionally one of more other α-olefin monomer in the presence of a Ziegler catalyst.

The reference material used in determination of the abrasion index may for example be Ticona GUR 4120.

Said other α-olefin monomer is selected from propylene, 1-butene, 1-pentene, 1-hexene, 1-octene, 4-methyl-1-pentene, 1,3-butadiene, 1,4-pentadiene, 1,5-hexadiene and mixtures thereof.

Preferably, said polyethylene has a molecular weight of more than 500.000 g/mol. More preferably, said polyethylene has a molecular weight of more than 1.000.000 g/mol, even more preferably more than 2.000.000 g/mol, even more preferably more than 3.000.000 g/mol, even more preferably more than 4.000.000 g/mol, even more preferably more than 5.000.000 g/mol, even more preferably more than 7.000.000 g/mol, even more preferably more than 10.000.000 g/mol. For example, the polyethylene may have a molecular weight of less than 20.000.000 g/mol, alternatively 15.000.000 g/mol. For example, the polyethylene may have a molecular weight of more than 1.000.000 and less than 15.000.000 g/mol.

Preferably, said polyethylene has an elongational stress measured at 150° C. over a 10 minute period of less than 0.50 MPa. More preferably said polyethylene has an elongational stress of less than 0.40 MPa, even more preferably less than 0.35 MPa, even more preferably less than 0.30 MPa, even more preferably less than 0.25 MPa.

In one preferred embodiment, said polyethylene has an abrasion index of less than 80, said abrasion index measured according to ISO 15527:2010 where the reference material according to ISO 15527:2010 is set to 100. More preferably, said polyethylene has an abrasion index of less than 75, even more preferably less than 70, even more preferably less than 65, even more preferably less than 60, even more preferably less than 55, even more preferably less than 50.

The heterogeneous Ziegler catalysts as used in the present description are defined as a transition metal-containing solid catalyst compounds comprising a transition metal halide selected from titanium halide, chromium halide, hafnium halide, zirconium halide, and vanadium halide, optionally supported on a metal or metalloid compound (e.g. a magnesium dichloride or silica). This distinguishes heterogeneous Ziegler catalysts from so-called single site catalysts such as metallocenes or post-metallocenes.

In one embodiment of the present invention, said polyethylene is a polyethylene powder produced by polymerizing ethylene in the presence of a catalyst composition comprising I) the product obtained by combining:
  a) a hydrocarbon solution comprising:
    i) a magnesium-containing compound selected from an organic oxygen-containing magnesium compound and a halogen-containing magnesium compound; and
    ii) an organic oxygen-containing titanium compound;
  b) a solution comprising:
    i) a metal-containing compound having the formula (I):

$$MeR_nX_{3-n} \qquad (I)$$

in which X is a halogen, Me is a metal of group III of Mendelejev's Periodic Table of Elements, R is a hydrocarbon moiety comprising 1-10 carbon atoms, and n is 0<n<3, or a dimer of a compound of formula (I); and ii) a silicon-containing compound of formula $R'_m SiCl_{4-m}$ in which 0≤m≤2 and R' is a hydrocarbon moiety comprising at least one carbon atom;
  in which the combination of solutions a) and b) results in a suspension of solid particles;
II) an organo aluminium compound having the formula AlR'$_3$ in which R' is a hydrocarbon moiety containing 1-10 carbon atoms, and
III) one or more of an external electron donor selected from the group of 1,2-dialkoxy hydrocarbon compounds
in which
  the molar ratio of the external electron donor III) to the titanium present in I) is between 0.5 and 5.5
  the span of the polyethylene powder obtained from the process is between 0.9 and 1.3.

A polyethylene powder having such span shows improved processing properties such as mouldability. A polyethylene powder having such span shows desirable color homogeneity when colored with colorants such as pigments. If the span exceeds such values, inhomogeneity in color may occur.

According to a preferred embodiment, the magnesium-containing compound is selected from organic oxygen-containing magnesium compounds and halogen-containing magnesium compound. Preferably the magnesium-containing compound is selected from organic oxygen-containing magnesium compounds. Suitable organic oxygen-containing compounds include alkoxides such as magnesium methylate, magnesium ethylate and magnesium isopropylate, and alkylalkoxides such as magnesium ethylethylate. Preferably, the organic oxygen-containing magnesium compound is magnesium ethylate. Suitable halogen-containing magnesium compounds include magnesium dihalides and magnesium dihalide complexes, in which the halide preferably is chloride. Most preferably, the halogen-containing magnesium complex is magnesium dichloride.

The halogen is selected from chlorine, bromine or iodine. Preferably, the halogen is chlorine.

The hydrocarbon solution of the organic oxygen-containing magnesium compound and the organic oxygen-containing titanium compound can be prepared using aliphatic or aromatic hydrocarbons as the solvent. Preferably the hydrocarbon solution of the organic oxygen-containing magnesium compound and the organic oxygen-containing titanium compound can be prepared using aliphatic hydrocarbons as the solvent. Preferably, said hydrocarbons are selected from heptane, hexane, pentane, octane or mixtures thereof, including the isomers thereof.

In another preferred embodiment, the catalyst composition is produced using a metal-containing compound having the formula (I):

$$MeR_nX_{3-n} \qquad (I)$$

or a dimer of a compound of formula (I)
in which:
R is a hydrocarbon moiety comprising 4-10 carbon atoms
the metal Me is selected from aluminium, gallium or boron
the halogen X is chlorine, bromine or iodine.

In a preferred embodiment, the metal-containing compound is selected from n-butyl aluminium dichloride, isobutyl aluminium dichloride, diisobutyl aluminium chloride, di-n-butyl aluminium chloride, sesquiisobutyl aluminium chloride, ethyl aluminium dibromide, ethyl aluminium dichloride, propyl aluminium dichloride, diethyl aluminium chloride, diisobutyl aluminium chloride, or mixtures thereof.

The organic oxygen-containing titanium compound is selected from titanium alkoxides, titanium phenoxides, titanium oxyalkoxides, condensed titanium alkoxides, titanium carboxylates and titanium enolates. Preferably, the organic oxygen-containing titanium compound is a titanium alkoxide. Preferably, the titanium alkoxide is selected from Ti (OC$_2$H$_5$)$_4$, Ti (OC$_3$H$_7$)$_4$, Ti (OC$_4$H$_9$)$_4$, and Ti (OC$_8$H$_{17}$)$_4$. Most preferably, the titanium compound is Ti (OC$_4$H$_9$)$_4$.

The molar ratio of the metal in the metal-containing compound having the formula (I):

$$MeR_nX_{3-n} \quad (I)$$

to the organic oxygen-containing titanium compound preferably is between 0.01 and 0.5, more preferably between 0.1 and 0.4, and even more preferably between 0.1 and 0.35.

The molar ration of magnesium to titanium is preferably lower than 3:1, and more preferably between 0.2:1 and 3:1.

The molar ratio of the chlorine from the silicon containing compound R'$_m$SiCl$_{4-m}$ to magnesium is preferably higher than 2, more preferably higher than 3 and even more preferable higher than 4.

The silicon-containing compound of formula R'$_m$SiCl$_{4-m}$ is selected from dimethyl dichlorosilane, diethyl dichlorosilane, isobutylmethyl dichlorosilane, diisopropyl dichlorosilane, diisobutyl dichlorosilane, isopropylisobutyl dichlorosilane, dicyclopentyl dichlorosilane, cyclohexylmethyl dichlorosilane, phenylmethyl dichlorosilane, diphenyl dichlorosilane, methyl trichlorosilane, ethyl trichlorosilane, n-propyl trichlorosilane, isopropyl trichlorosilane, n-butyl trichlorosilane, isobutyl trichlorosilane, n-pentyl trichlorosilane, n-hexyl trichlorosilane, n-octyl trichlorosilane, isooctyl trichlorosilane, phenyl trichlorosilane, or tetrachlorosilane. Preferably, the silicon-containing compound of formula R'$_m$SiCl$_4$ is tetrachlorosilane.

In a preferred embodiment, a co-catalyst is employed in the process for production of polyolefins using catalysts according to the present invention. The co-catalyst is preferably an organo-aluminium compound having the formula AlR"$_3$. Preferably, R" is a hydrocarbon moiety containing 1-10 carbon atoms. Suitable organo-aluminium compounds of formula AlR"$_3$ include trimethyl aluminium, triethyl aluminium, triisobutyl aluminium, tri-n-hexyl aluminium and tri octyl aluminium.

The catalyst of the present invention may be obtained for example by a first reaction between a magnesium alkoxide and a titanium alkoxide, followed by dilution with a hydrocarbon solvent, resulting in a soluble complex consisting of a magnesium alkoxide and a titanium alkoxide and thereafter a reaction between a hydrocarbon solution of said complex and a mixture of a metal-containing compound having the formula (I):

$$MeR_nX_{3-n} \quad (I)$$

in which X is a halogen, Me is a metal of group III of Mendelejev's Periodic Table of Elements, R is a hydrocarbon moiety comprising 1-10 carbon atoms, and n is 0<n<3, or a dimer of a compound of formula (I); and a silicon-containing compound of formula R'$_m$SiCl$_{4-m}$ in which 0≤m≤2 and R' is a hydrocarbon moiety comprising at least one carbon atom.

Preferably, the metal-containing compound is an aluminium compound having the formula (III):

$$AlR_nX_{3-n} \quad (III)$$

in which X is a halogen, R is a hydrocarbon moiety comprising 1-10 carbon atoms, and n is 0<n<3, or a dimer of a compound of formula (III); Preferably, this aluminium compound is used as a solution in a hydrocarbon. Any hydrocarbon that does not react with the aluminium compound is suitable to be applied as the solvent.

The aluminium compound may be present in the form of a dimer of an aluminium compound having the formula (III).

The sequence of the addition can be either adding the hydrocarbon solution containing the organic oxygen containing magnesium compound and the organic oxygen containing titanium compound to the mixture of the aluminium compound of formula (III) and the silicon-containing compound of formula R'$_m$SiCl$_{4-m}$ or the reversed.

The temperature for this reaction can be any temperature below the boiling point of the used hydrocarbon.

Room temperature is in the present invention understood to be 20° C.

In the reaction of the hydrocarbon solution of organic oxygen containing magnesium compound and organic oxygen containing titanium with the mixture of the aluminium compound of formula (III) and the silicon-containing compound of formula R'$_m$SiCl$_{4-m}$, a solid precipitates and after the precipitation reaction the resulting mixture is heated for a certain period of time to finish the reaction. After the reaction the precipitate is filtered and washed with a hydrocarbon. Other means of separation of the solids from the diluents and subsequent washings can also be applied, like for example multiple decantation steps. All steps should be performed in an inert atmosphere of nitrogen or another suitable inert gas.

It is essential that the metal compound of formula MeR$_n$X$_{3-n}$ and the silicon-containing compound of formula R'$_m$SiCl$_{4-m}$ are used as a mixture in the reaction with the hydrocarbon solution, instead of introducing the compounds separately or sequentially, as only the procedure in which the metal compound of formula MeR$_n$X$_{3-n}$ and the silicon-containing compound of formula R'$_m$SiCl$_{4-m}$ are used as a mixture will result in the desired results.

Preferably, the molar ratio of the external electron donor III) to the titanium present in I) is higher than 1.0, more preferably higher than 1.5, even more preferably higher than 2.0, even more preferably higher than 2.5, even more preferably higher than 3.0, even more preferably higher than 3.5, even more preferably higher than 4.0, even more preferable higher than 4.4.

The molar ratio of the external donor III) to the titanium present in I) is lower than 10.0, alternatively lower than 8.0, alternatively lower than 6.0.

Preferably, the molar ratio of the external electron donor III) to the titanium present in I) is lower than 5.5, more preferably lower than 5.0, even more preferably lower than 4.5.

The average particle size (D$_{50}$) and span of the polymer powders was determined according to ISO-13320:2009.

Preferably, the average particle size D$_{50}$ of the polymer powders is lower than 250 μm, more preferably lower than 225 μm, even more preferably lower than 200 μm, even more preferably lower than 175 μm, even more preferably lower than 150 μm.

Preferably, the span of the polyethylene powder obtained from the process is greater than 0.95, more preferably greater than 1.00, even more preferably greater than 1.05, even more preferably greater than 1.10, even more preferably greater than 1.15, even more preferably greater than 1.20.

Preferably, the span of the polyethylene powder obtained from the process is less than 1.3, more preferably less than 1.25.

For example, the span of the polyethylene powder may be ≥1.00 and ≤1.30, alternatively ≥1.10 and ≤1.25.

The invention also relates to a process for the production of polyethylene in which the process comprises the polymerization of ethylene in the presence of a catalyst composition comprising
I) the product obtained by combining:
  a) a hydrocarbon solution comprising:
    i) a magnesium-containing compound selected from an organic oxygen-containing magnesium compound and a halogen-containing magnesium compound; and
    ii) an organic oxygen-containing titanium compound;
  b) a solution comprising:
    i) a metal-containing compound having the formula (I):

in which X is a halogen, Me is a metal of group III of Mendelejev's Periodic Table of Elements, R is a hydrocarbon moiety comprising 1-10 carbon atoms, and n is 1≤n<3, or a dimer of a compound of formula (I); and
    ii) a silicon-containing compound of formula R'$_m$SiCl$_{4-m}$ in which 0≤m≤2 and R' is a hydrocarbon moiety comprising at least one carbon atom;
  in which the combination of solutions a) and b) results in a suspension of solid particles;
II) an organo aluminium compound having the formula AlR'$_3$ in which R' is a hydrocarbon moiety containing 1-10 carbon atoms, and
III) one or more of an external electron donor selected from the group of 1,2-dialkoxy hydrocarbon compounds
to obtain a polyethylene powder.

In a preferred embodiment of the process, the molar ratio of the external electron donor (III) to the titanium present in I) is between 0.5 and 5.5.

In a further embodiment, the span of the polyethylene powder obtained from the process is between 0.9 and 1.3.

Preferably, the metal-containing compound according to Formula (I) is selected from ethyl aluminium dibromide, ethyl aluminium dichloride, propyl aluminium dichloride, n-butyl aluminium dichloride, isobutyl aluminium dichloride, diethyl aluminium chloride, diisobutyl aluminium chloride.

The silicon-containing compound preferably is SiCl$_4$.

The catalyst may have an average particle size D$_{50}$ of ≤4.5 μm, alternatively ≤4.0 μm. Preferably, the catalyst has an average particle size D$_{50}$ of ≤4.0 μm. More preferably, the catalyst has an average particle size D$_{50}$ of ≤3.8 μm.

The average particle size D$_{50}$ is the average particle size of the catalyst particles measured according to ISO-13320: 2009.

Polyethylenes having such combination of span which are produced using a catalyst composition comprising such molar ratio of the external donor III to the titanium present in I) and having an such average particle size of the catalyst provide a desired improved balance of processability, such as mouldability, wear resistance and homogeneity in coloring.

Preferably, the external electron donor is one or more selected from the group of 1,2-diether. More preferably, the external electron donor is one or more selected from 1,2-dimethoxybenzene, 1,2,4-trimethoxybenzene, 1,2-diethoxybenzene, 2,3-dimethoxytoluene, 1-allyl-3,4-dimethoxybenzene, 1,2-dimethoxyethane, 1,2-dimethoxy cyclohexane, 1,2-dimethoxypropane, 1,2-dimethoxybutane, 2,3-dimethoxybutane and/or mixtures thereof. Even more preferably, the external electron donor is selected from 1,2-dimethoxybenzene, 1-allyl-3,4-dimethoxybenzene and/or mixtures thereof.

The molecular mass of the polymer can be controlled by any means as known in the art, such as for example by adjustment of the polymerization temperature or by the addition of molecular weight control agents such as hydrogen or zinc alkyls.

The polymerisation reaction of ethylene may be performed in the gas phase or in bulk in the absence of an organic solvent, or carried out in liquid slurry in the presence of an organic diluent. The polymerisation can be carried out batchwise or in a continuous process. In a preferred embodiment of the present invention, the polymerisation is carried out in a continuous process. The polymerisation can also be carried out in multiple interconnected reactors, for example in 2 reactors in series using different conditions in each reactor in order to broaden the molecular weight and compositional distribution of the polyethylene. These reactions are performed in the absence of oxygen, water, or any other compounds that may act as a catalyst poison. Suitable solvents include for example alkanes and cycloalkanes such as pentane, hexane, heptane, n-octane, iso-octane, cyclohexane, and methylcyclohexane; alkylaromatics such as toluene, xylene, ethylbenzene, isopropylbenzene, ethyltoluene, n-propylbenzene and diethylbenzene. The polymerisation temperature may range between 20° C. and 200° C. and preferably ranges between 20° C. and 120° C. The partial pressure of a monomer during polymerisation may be the atmospheric pressure and more preferably a partial pressure between 2 and 40 bars.

The polymerisation can be carried out in the presence of a so-called anti-static agent or anti fouling agent, in an amount ranging from 1 to 500 ppm related to the total reactor contents.

The catalyst according to the invention may be applied in ethylene polymerisation processes to produce for example high density polyethylene, linear low density polyethylene and ultra high molecular weight polyethylene. Polyethylenes and production processes are disclosed in "Handbook of polyethylene" by Peacock at pages 1-66 (ISBN 0-8247-9546-6).

Due to the very high molecular weight of UHMWPE, it is difficult to analyze its molar mass by for instance Gel Permeation Chromatography (GPC) or Size Exclusion Chromatography (SEC). Alternatively, the so called Elongational Stress can be determined according to ISO-11542-2:1998. This Elongational Stress, sometimes also referred to as "Flow Value", can subsequently be translated into the molecular weight as disclosed for example by J. Berzen et al. in The British Polymer Journal, Vol. 10, December 1978, pp 281-287.

The invention further relates to articles prepared from the UHMWPE powder prepared according to the present invention. Said articles are for example moulded articles such as rods, tubes, bars, profiles, and sheets. Said articles may be prepared by extrusion moulding, compression moulding, ram extrusion, injection moulding and/or processing via solution routes. Articles prepared via solution routes are for example fibers, tapes, sheets, films and membranes. Said articles may be used in medical applications, as separators in batteries, filters, prosthetics, gears, bearings, ballistic applications, yarns, or ropes.

Alternatively, the UHMWPE powder according to the present invention may be used as ingredient in polymer compositions, for example in order to improve the wear characteristics of such polymer compositions.

The invention will now be illustrated by the following non-limiting examples.

Experiment I: Preparation of Hydrocarbon Solution of Magnesium-Containing Compound and Organic Oxygen-Containing Titanium Compound To a 3 l round bottom flask equipped with a stirrer, a dropping funnel and a water cooler, 185 g of $Mg(OC_2H_5)_2$ (1.62 mol) as a solid and 275 ml of $Ti(OC_4H_9)_4$ (0.799 mol) as a liquid were added, both at room temperature (20° C.). The dropping funnel was filled with 2792 ml of hexane. The mixture of $Mg(OC_2H_5)_2$ and $Ti(OC_4H_9)_4$ in the round-bottom flask was heated to a temperature of 180° C. and stirred at 300 rpm for 1.5 hours. A clear liquid was obtained. The mixture was then cooled down to 120° C. The hexane was added slowly whilst the solution was kept at a temperature of 120° C. After the hexane was added to the solution completely, the solution was cooled down to room temperature. The resulting solution was stored under nitrogen. Analyses on the solution showed a titanium concentration of 0.25 mol/l.

Experiment IIA: Catalyst Preparation

In a 10 l baffled reactor equipped with a stirrer and a condenser, 4000 ml of hexane was introduced. To this, 35 ml of a 50% ethyl aluminium dichloride (120 mmol Al) solution in hexane was added, followed by 173 ml of tetrachlorosilane. The stirrer was started at 800 rpm. Via a peristaltic pump, 2000 ml of the solution of Experiment I was added gradually over a period of 4 h, during which the reactor was kept at room temperature (20° C.). The resulting suspension was subsequently refluxed for 2 h at the boiling temperature of hexane (69° C.), after which it was cooled down to room temperature, filtered and washed with 8 l of hexane. The obtained catalyst was mixed with hexane, and stored under nitrogen. The resulting catalyst had an average particle size $D_{50}$ of 4.72 μm and a span of 0.87.

Experiment IIB: Catalyst Preparation

In a 10 l baffled reactor equipped with a stirrer and a condenser, 4000 ml of hexane was introduced. To this, 35 ml of a 50% ethyl aluminium dichloride (120 mmol Al) solution in hexane was added, followed by 173 ml of tetrachlorosilane. The stirrer was started at 1300 rpm. Via a peristaltic pump, 2000 ml of the solution of Experiment I was added gradually over a period of 4 h, during which the reactor was kept at room temperature (20° C.). The resulting suspension was subsequently refluxed for 2 h at the boiling temperature of hexane (69° C.), after which it was cooled down to room temperature, filtered and washed with 8 l of hexane. The obtained catalyst was mixed with hexane, and stored under nitrogen. The resulting catalyst had an average particle size $D_{50}$ of 3.67 μm and a span of 1.01.

Experiment III: Polymerisation

Ethylene was polymerized in a continuously operated 20 l CSTR reactor which was filled to 75% of its volume with hexane. The reactor is heated to 75° C. Hexane (2.947 kg/h), ethylene (1.053 kg/h) and hydrogen were continuously fed to the reactor at a temperature of 75° C. The feed of hydrogen in Examples IIIA to IIIF is presented in table I. The feed of ethylene was controlled by maintaining the ethylene pressure at values as indicated in table I, examples IIIA to IIIF. The fill level of the CSTR reactor was maintained at 75% of its volume. Triisobutyl aluminium was continuously added to the reactor in such an amount that the calculated concentration of aluminium in the outlet stream of the reactor was kept at 40 ppm. An anti-fouling agent (Stat Safe 6633) was continuously added to the reactor in such an amount that the calculated concentration of the anti-fouling agent was kept at 40 ppm. In examples IIID, IIIE and IIIF, 1,2-dimethoxybenzene was continuously added to the reactor in in quantities to satisfy the ratio of donor:Ti as presented in table 1. The catalyst obtained from Experiment IIA or IIB was added to the reactor in a controlled way so as to obtain a polyethylene powder having an average particle size $D_{50}$ of between 140 and 160 μm. In Examples IIIA, IIIB and IIIC, the catalyst obtained from Experiment IIA was used; in Examples IIID, IIIE and IIIF, the catalyst obtained from Experiment IIB was used.

COMPARATIVE EXAMPLES

Several commercially available UHMWPE grades were used as comparative examples. In example C-1, Stamylan UH610 (available from DSM) was used; in example C-2, GUR 4150 (available from Celanese) was used; in example C-3, GUR 4120 (available from Celanese) was used.

TABLE 1

| Example | Ethylene pressure (bar) | Hydrogen feed (mg/h) | Yield kg/g | Ratio donor: Ti | Bulk density (kg/m³) | $D_{50}$ (μm) | Span | Elongational Stress (MPa) | Abrasion Index (%) |
|---|---|---|---|---|---|---|---|---|---|
| IIIA | 5.65 | 10 | 8.6 | — | 426 | 155 | 1.3 | 0.245 | 75 |
| IIIB | 5.70 | 14 | 8.3 | — | 413 | 146 | 1.2 | 0.217 | 92 |
| IIIC | 6.50 | 14 | 9.6 | — | 400 | 160 | 1.3 | 0.295 | 80 |
| IIID | 10.60 | 20 | 25.0 | 3.9 | 460 | 143 | 1.2 | 0.205 | 80 |
| IIIE | 10.70 | 20 | 21.0 | 4.4 | 470 | 140 | 1.3 | 0.276 | 67 |
| IIIF | 11.30 | 10 | 25.0 | 5.3 | 474 | 146 | 1.0 | 0.461 | 65 |
| C-1 | | | | | 544 | 143 | 0.8 | 0.543 | 80 |
| C-2 | | | | | 495 | 120 | 1.1 | 0.485 | 79 |
| C-3 | | | | | 456 | 128 | 1.0 | 0.266 | 100 |

The yield is defined as the quantity of polyethylene in kilograms produced per quantity of catalyst in grams that is introduced into the reactor.

The ratio donor:Ti is defined as the molar ratio of the external donor to the titanium present in I) of the catalyst.

The bulk density was measured according to ISO 60:1977.

The average particle size $D_{50}$ is the average particle size of the polymer particles measured according to ISO-13320:2009. The span is calculated as $(D_{90}-D_{10})/D_{50}$. $D_{90}$ and $D_{10}$ were measured according to ISO-13320:2009.

Elongational stress was measured according to ISO 11542-2:1998 at 150° C. over a 10 minute period. For measurement of the elongational stress, the polyethylene powders obtained from Experiment III, examples IIIA to IIIF and the Comparative Examples C-1 to C-3 were shaped into test specimens by compression moulding. The thus obtained specimens were tested according to Annex A of ISO 11542-2:1998.

Abrasion resistance was measured according to ISO 15527:2010. For measurement of abrasion resistance, the polyethylene powders obtained from Experiment III, examples IIIA to IIIF and the Comparative Examples C-1 to C-3 were shaped into test specimens by compression moulding. The thus obtained specimens were tested according to Annex B of ISO 15527:2010. The reference material used in determination of the abrasion index was Ticona GUR 4120.

The above presented examples clearly show that the polyethylenes according to the present invention have a superior balance of processability and wear characteristics.

The invention claimed is:

1. Polyethylene homo- or copolymer characterized in that the abrasion index of said polyethylene is related to the elongational stress according to the formula:

$$AI < \frac{ES - \beta}{\alpha}$$

in which
ES=elongational stress as measured according to ISO 11542-2:1998
AI=abrasion index, as measured according to ISO 15527:2010 where the reference material according to ISO 15527:2010 is set to 100;
$\beta < 1.7$; and
$-0.015 > \alpha > -0.017$.

2. Polyethylene according to claim 1 in which the polyethylene is produced by reacting ethylene with optionally one of more other α-olefin monomer in the presence of a Ziegler catalyst.

3. Polyethylene according to claim 1 in which the polyethylene has a molecular weight of more than 500,000 g/mol.

4. Polyethylene according to claim 1 in which the elongational stress is less than 0.5 MPa.

5. Polyethylene according to claim 1 in which the abrasion index is less than 80, said abrasion index measured according to ISO 15527:2010 where the reference material according to ISO 15527:2010 is set to 100.

6. Process for the production of polyethylene according to claim 1 in which the process comprises the polymerization of ethylene in the presence of a catalyst composition comprising
I) the product obtained by combining:
a) a hydrocarbon solution comprising:
i) a magnesium-containing compound selected from an organic oxygen-containing magnesium compound and a halogen-containing magnesium compound; and
ii) an organic oxygen-containing titanium compound;
b) a solution comprising:
i) a metal-containing compound having the formula (I):

MeR$_n$X$_{3-n}$  (I)

in which X is a halogen, Me is a metal of group III of Mendelejev's Periodic Table of Elements, R is a hydrocarbon moiety comprising 1-10 carbon atoms, and n is $1 \leq n < 3$, or a dimer of a compound of formula (I); and
ii) a silicon-containing compound of formula R'$_m$SiCl$_{4-m}$ in which $0 \leq m \leq 2$ and R' is a hydrocarbon moiety comprising at least one carbon atom;
in which the combination of solutions a) and b) results in a suspension of solid particles;
II) an organo aluminium compound having the formula AlR'$_3$ in which R' is a hydrocarbon moiety containing 1-10 carbon atoms, and
III) one or more of an external electron donor selected from the group of 1,2-dialkoxy hydrocarbon compounds to obtain a polyethylene powder.

7. Process according to claim 6 in which the molar ratio of the external electron donor III) to the titanium present in I) is between 0.5 and 5.5, and the span of the polyethylene powder obtained from the process as measured according to ISO-13320:2009 is between 0.9 and 1.3.

8. Process according to any claim 6 in which:
the metal-containing compound is one or more selected from n-butyl aluminium dichloride, isobutyl aluminium dichloride, diisobutyl aluminium chloride, di-n-butyl aluminium chloride, sesquiisobutyl aluminium chloride, ethyl aluminium dibromide, ethyl aluminium dichloride, propyl aluminium dichloride, diethyl aluminium chloride, and diisobutyl aluminium chloride;
the silicon-containing compound is SiCl$_4$; and
the external electron donor is one or more selected from 1,2-dimethoxybenzene, 1,2,4-trimethoxybenzene, 1,2-diethoxybenzene, 2,3-dimethoxytoluene, 1-allyl-3,4-dimethoxybenzene, 1,2-dimethoxyethane, 1,2-dimethoxy cyclohexane, 1,2-dimethoxypropane, 1,2-dimethoxybutane, and 2,3-dimethoxybutane.

9. Process according to claim 6, wherein the process is a continuous process.

10. Polyethylene according to claim 1, wherein $\beta < 1.5$.

11. Polyethylene according to claim 10, wherein $\beta < 1.3$.

12. Polyethylene according to claim 1, wherein $-0.016 > \alpha > -0.017$.

13. Polyethylene according to claim 12, wherein $-0.0165 \geq \alpha > -0.017$.

14. Polyethylene homo- or copolymer characterized in that the abrasion index of said polyethylene is related to the elongational stress according to the formula:

$$AI < \frac{ES - \beta}{\alpha}$$

in which
ES=elongational stress as measured according to ISO 11542-2:1998
AI=abrasion index, as measured according to ISO 15527:2010 where the reference material according to ISO 15527:2010 is set to 100;
$\beta < 1.8$; and
$-0.0165 \geq \alpha > -0.017$.

15. Polyethylene according to claim 3, wherein $-0.016 > \alpha > -0.017$.

16. Polyethylene according to claim 15, wherein $-0.0165 \geq \alpha > -0.017$.